Jan. 17, 1961 J. COSAR 2,968,737
CONTROL SYSTEM FOR PARALLELED TAP-CHANGE TRANSFORMERS
Filed Sept. 15, 1958

\* = RELAYS Z1, Z2 SHOWN IN ENERGIZED POSITION
(CONTACTS OF OTHER RELAYS SHOWN IN NORMAL POSITIONS)

COMMON PORTION OF COORDINATING CONTROL SYSTEM | CIRCUIT FOR T1 MOTOR 20 | CIRCUIT FOR T2 MOTOR 30

THESE TWO CIRCUITS NOT NECESSARILY THE SAME

INVENTOR.
JACK COSAR
BY
Reynolds, Beach & Christensen
ATTORNEYS

United States Patent Office 2,968,737
Patented Jan. 17, 1961

2,968,737

CONTROL SYSTEM FOR PARALLELED TAP-CHANGE TRANSFORMERS

Jack Cosar, 2346 Dunlevy, Victoria, British Columbia, Canada

Filed Sept. 15, 1958, Ser. No. 761,029

10 Claims. (Cl. 307—51)

This invention relates to a control scheme for the tap-changers of paralleled transformers and particularly to a coordination system preventing paralleled tap-changers from dropping out of step with each other. The invention is herein illustratively described by reference to presently preferred apparatus for a typical application; however it will be recognized that it has other forms and that certain modifications and changes therein may be made without departing from the essential features involved. This application is a continuation-in-part of application Serial No. 469,531, filed November 17, 1954, now abandoned, for Transformer Control Systems.

Where two or more motor-operated tap-changing transformers are connected to a common paralleling bus it is desirable to keep the tap-changers in step at all times mainly to avoid harmful circulating currents between the units. Existing methods of achieving this purpose generally require special position switches mounted on the tap-changing motor mechanism. Each of these switches consists of two separate contacts, one of which operates alternately on all even positions and the other alternately on all odd positions of the tap-changer.

Serious disadvantages exist when it is necessary to parallel tap-changing transformers using a control system which requires these special even-odd position switches. Firstly, the motor control systems of all units must be designed to be suitable for interconnection with each other. This is generally impractical for the reason that units of different manufacture frequently differ in one or more respects, such as the number of motor phase windings used, voltage ratings and control system differences such as seal-in elements, motor braking, and limit switch circuit variations. In the case of existing installations requiring the addition of one or more tap-change transformers to work with one already installed in order to carry heavier loads it is extremely costly in most cases to adapt such special switches and redesign the motor control system of the installed tap-changer in order to prepare it for a conventionally controlled paralleling arrangement.

It is, therefore, an object of this invention to provide a simplified and relatively inexpensive coordinated automatic control system for paralleled tap-changing transformers of any manufacture which coordinates the action of all units to insure the completion of an initiated tap-change in all units, whether up or down, before applying further raise or lower signals to any individual unit.

It is a further and related object of this invention to provide such a coordinated control system, either for automatic or manually initiated tap-change operation, which may be standardized in a simple, inexpensive and reliable form regardless of differences between various units with which it may be used, or differences in the motor control circuits of the various units.

It is an object of this invention to provide reliable automatic annunciation of the failure of any of the tap-changers to operate when required by the coordinated control system responsible for actuation of all units.

It is an object of this invention to provide a control system in which the removal of one or more units from service or its manual operation does not affect the operation of the other units.

It is an object of this inventon to provide a control system in which all voltage sensitive relays, timers, compensators and associated control switches for complete automatic or manual control may be located indoors away from the weather and free from transformer vibration.

The invention provides a coordinated control circuit adapted to keep the taps of two or more paralleled tap-changing transformers in step with one another. In this novel system the motor-operated tap-changers have individual motor control systems and the coordination controls are such that momentary "raise" or "lower" energization signals supplied to all the motor control systems with the tap-changers in a given position will cause the respectively associated motors to raise or lower the settings of their tap-changers by one increment only. Thus a one-step change represents a completed cycle of change in the overall system as well as in each motor control system. It is further to be noted that the coordinated control circuit is interrupted by positive control action, not after but during each tap-change operation, and is re-established to permit initiation of further tap-change signals only when and if all of the tap-changers have completed their signalled shift to the next adjacent tap position. The control circuit remains interrupted if the measured bus voltage is restored to the desired value by the one tap change. The control circuit also remains interrupted if none of the tap-changers move when a change is signalled (viz. possibly because all are already at a limit position). Automatic annunciator means is also provided in the preferred form of the system, and is responsive to continued control circuit interruption, whether by a continuing requirement for a change of tap position or by failure of all units to attain a signalled change of tap position one any unit starts the change.

The invention in its preferred form takes advantage of the practical fact that spare contacts are generally provided on all tap-changers. These contacts are mechanically actuated by movement of their respective associated tap-changers and are preferably closed with the tap-changer on any one of its tap positions and opened in response to and during movement off that position. These switches, or their equivalent, together with coordinating apparatus and interconnecting means comprise the novel coordinated control circuit.

Figure 1:
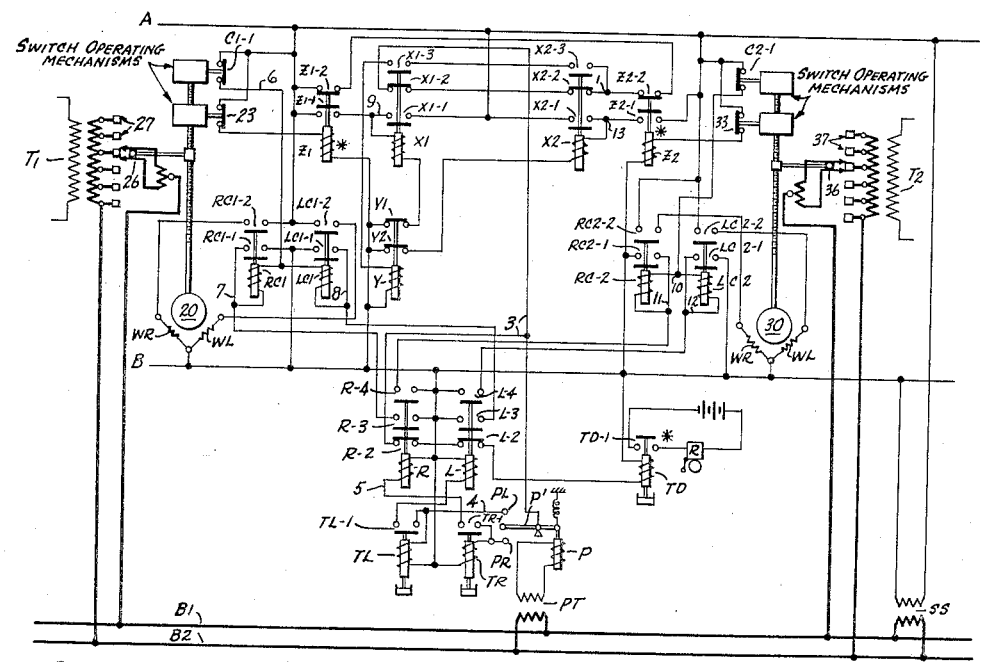
Figure 1 is a schematic circuit diagram which illustrates the preferred embodiment of the invention.
Figure 2:
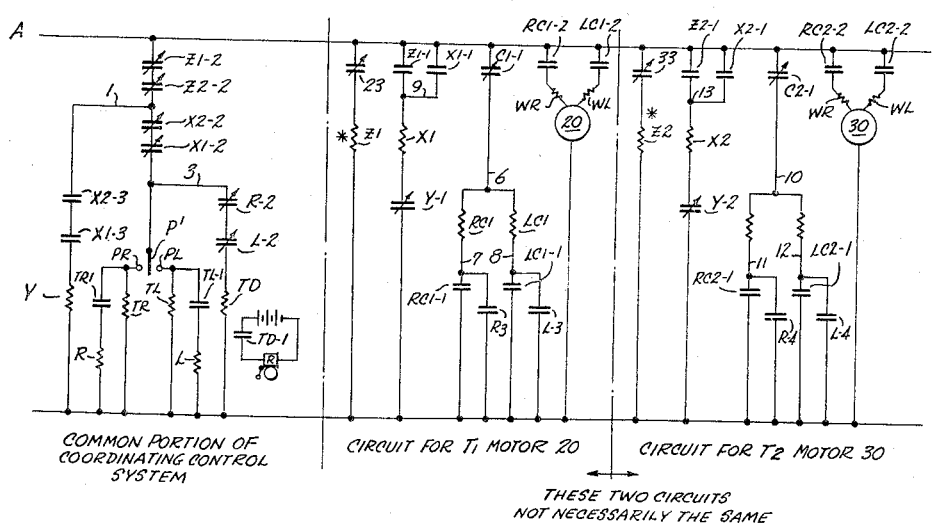
Figure 2 is a simplified functional schematic of the same circuit arrangement shown in a form in which circuit paths are more easily traced for visualizing operation than in Figure 1, using the same identifying symbols for parts as in Figure 1.

In the figures two tap-changing transformers T1 and T2 are shown connected to a common paralleling bus B1 and B2. A supply transformer SS is connected to this bus to provide a source of supply for the motor and control circuit by way of supply lines A and B. A potential transformer PT is also connected to this bus to provide a potential supply for the primary voltage relay P. Relay P will, therefore, operate to close its contact PR in the event that the voltage at PT is below its predetermined allowable minimum value and will likewise close its contact PL if the voltage at PT is higher than its predetermined allowable maximum value.

In the figures, for convenience in description and illustration, the tap-change motors 20 and 30 and their circuits are shown identical. However, it will be appreciated that frequently they will in practice differ in various possible ways due usually to manufacturer design differences. However, a person skilled in the art understanding the principles of the invention as herein described in connection with similar motors will readily recognize how to revise the circuit connections to suit different types of motors and motor controls. Also for the sake of simplicity, the tap-changer limit switches, fuses, and other auxiliary apparatus required for the manual operation of the tap-changers are omitted from the drawings.

For the purpose of this invention the tap-changers are only required to complete a raise or lower tap-change operation to the next adjacent position from a momentary closure of contacts R-3 and R-4 for a raise operation, and L-3 and L-4 for a lower operation.

Contacts C1-1 and C2-1 are or may be typical motor seal-in switches for the respective motors 20 and 30 and are so operated by their respective operating mechanisms, the details of which are or may be conventional and are therefore omitted herein, that these switches remain in a closed position during a tap-change operation and only open briefly near the end of each tap-change step. They are connected in series with the respective windings of motor raise or lower relays RC1, RC2 or LC1, LC2 and when they open permit such relays to become deenergized. The operation of these motor relays is as follows: upon a momentary closure of, say, contacts L-3 of lower relay L, a circuit is complete from line A through contacts C1-1 to conductor 6, then through relay LC1 to conductor 8, through the closed contact L-3 to conductor B. Relay LC1 becomes energized and closes its contacts LC1-1 and LC1-2. Contacts LC1-1 are holding contacts which provide a parallel path around contacts L-3 between conductors 8 and B; whereas motor lower contacts LC1-2 when closed provide an energizing path for the motor 20, connecting the motor lower winding WL between supply conductors A and B. Because of holding contacts LC1-1, with a tap-change operation in the lower direction thus begun, contacts L-3 can re-open without interfering with the completion of the tap-change. When the tap-change operation to the next adjacent lower position is almost complete, seal-in switch contacts C1-1 open momentarily, thus causing motor control relay LC1 to drop out, and thereby de-energize the motor 20 winding WL. Before the motor comes to a full stop contacts C1-1 close again, hence setting up the circuit for another operation. This they do for not only the motor lower relay LC1 but also for the similar motor raise relay RC1 which has contacts connected to the motor raise winding WR in the same manner as those of relay LC1 are connected to the motor lower winding WL, for motor 20. In like manner the windings WR and WL as well as seal-in contacts C2-1 of the other tap-changer motor 30, also operate under primary control of the voltage sensitivity relay P acting through relays R or L and RC2 or LC2, respectively.

The arrangements for parallel automatically initiated (by relays P, TL, TR) operation of the two tap-changers T1 and T2 in accordance with this invention in its preferred form for automatic control will now be discussed. The novel features of this invention are centered around the use and function of what are normally spare position-actuated contacts 23 provided with tap-changer T1, and similar contacts 33 with tap-changer T2, or the equivalent of such contacts. In the illustration, these contacts are closed on each and every tap position of the associated tap-changer and open during movement of such tap-changer from each such position to each adjacent position.

In Figure 1 the tap-changers are shown in a position with both brushes of their respective movable contacts 26 and 36 on the same individual stationary contact segments 27 and 37 respectively. A next adjacent tap position would, of course, be one in which the brushes of each pair both engage a next adjacent stationary contact segment in the respective series of segments 27 and 37. The primary voltage detection voltage relay P is shown connected directly to potential transformer PT. Alternatively engageable contacts PR and PL or relay P are both shown open, indicating a balanced or null condition of this relay corresponding to normal bus voltage. The relay P acts through time delay relays TL and TR in applying tap-change signals to the motor control circuits, so that transient voltage fluctuations will not disturb the tap-change mechanisms. Thus closed contact PL forms a connection for relay TL from conductor B to conductor 3, whereas closed contact PR does likewise for relay TR. The normally open contacts TL-1 and TR-1 of relays TL and TR are respectively connected between one side of relays L and R and contacts PL and PR, so that upon closure of either of the latter either relay L or relay R will be energized, assuming conductor 3 is then connected to conductor A to complete the energizing circuit for relay R or L between supply conductors A and B. Whether or not conductor 3 is so connected to that end, thereby to permit initiation of a tap-change operation by actuation of primary voltage sensing relay P depends upon the condition of relays Z1, Z2, X1 and X2 subsequently to be described.

Contacts 23 and like contacts 33 are actuated by respective operating mechanisms the details of which are or may be conventional, hence are omitted herein. Such operation is caused by operation of the respective motors 20 and 30 and in such manner that the contacts is closed when the tap-change mechanism is on any of its tap positions and are opened shortly after a tap-change begins, to remain open until the next tap position is reached. A relay Z1 associated with transformer T1 is connected to be energized from conductors A and B through closed contacts 23 of transformer unit T1. Since relay Z1 is shown energized its normally closed contacts Z1-1 are shown open and its normally open contacts Z1-2 are shown closed. In a similar fashion a relay Z2, associated with transformer T2, is connected to be energized from conductors A and B through closed contacts 33 of transformer unit T2. It may be seen then that since the two sets or pairs of contacts of each of relays Z1 and Z2 are alternately opened and closed by operation of switches 23 and 33, they are equivalent to contacts added to the transformers to operae with contacts 23 and 33. Additional relays X1 and X2 are also provided, each with three sets of contacts X1-1, X1-2, X1-3 and X2-1, X2-2, X3-3, respectively, the first and third named contacts in each set being normally opened and the second normally closed. Still another relay Y has two sets of contacts Y1 and Y-2. One side of both of these contacts of relay Y and one side of its winding are connected to conductor B and to one side of relay Z1, whose opposite side extends to one of the contacts 23. Contacts X1-3 are interposed serially with contacts X2-3, Z2-2 and Z1-2, between the other side of relay Y and conductor A, so that only if all of these contacts are simultaneously closed may relay Y be energized. Moreover, the common switch arm P' of relay P is connected through conductor 3 to conductor A through the serially arranged contacts X1-2, X2-2, Z2-2 and Z1-2 only when all four of these are simultaneously closed. Contacts X1-1 and X2-1 are holding contacts which close when their respective relays X1 and X2 are energized by opening of the respective switches 23 and 33, which thereby de-energize relays Z1 and Z2 and form energizing circuits for said relays X1 and X2 through the respective contacts Z1-1 and Z2-1 and the respective closed contacts Y-1 and Y-2.

Assume now that the bus voltage on the potential transformer PT is too high, requiring a lower operation in the tap-changers. Relay P closes its contact PL, completing an energizing circuit for relay TL. After its required time delay, relay TL closes its contacts TL-1, thus energizing primary lower relay L and thereby energizing the motor lower control relay LC-1 to complete the energizing circuit for motor 20 winding WL. Thus a tap-change in a lower direction has been initiated in transformer T1, as explained in a previous paragraph. A simultaneous lower operation in a similar fashion occurs for transformer T2 since contacts L-4 close simultaneously with contacts L-3, thus energizing motor control relay LC2. Thus the circuits to both motors 20 and 30 have been set up to enable both tap-changers to complete a tap-change step to the next adjacent lower position. As will now further be evident a tap-raise operation occurs in a fashion similar to the lower operation just described, since the closing of contact PR energizes relay TR which is connected in circuit with motor raise control relays RC-1 and RC2-2, respectively, and their contacts in turn to the motor windings WR, all in a manner similar to the lower-circuit arrangements.

There remains to be discussed the protective operation of the circuit in the event that one or more of the tap-changers either fails to begin or fails to complete a tap-change operation.

Immediately following the energizing of motors 20 and 30 already described, the tap-changers would begin to move to the next adjacent tap position. After a slight movement of the tap-changer, on, say, transformer T1, contacts 23 open, thus opening the energizing circuit of relay Z1. With relay Z1 de-energized its contacts Z1-1 close and contacts Z1-2 open. With the closure of contacts Z1-1 a circuit is complete from conductor A through contacts Z1-1 to conductor 9, through relay X1 and closed contacts Y1 to conductor B. Relay X1 picks up and seals itself in through its holding contacts X1-1 which are connected in parallel with contacts Z1-1 between conductors 9 and A.

The seal-in of relay X2 associated with transformer T2 by way of the operation of contact 33 and relay Z2 is connected and operated in a manner similarly to relay X1.

One desirable protective feature, although one secondary to the main tap-change coordinative arrangement, is the provision of an annunciator R controlled by a time delay drop-out relay TD. In the drawing the latter is shown in its energized condition, the circuit extending from conductor A through closed contacts Z1-2 and Z2-2 to conductor 1, thence through closed contacts X2-2 and X1-2 to conductor 3, thence through closed contacts R-2 and L-2, and finally through relay TD to conductor B. With the opening of contacts Z1-2 and X1-2, also Z2-2 and X2-2, the circuit between conductors A and 3 is broken. Time delay drop-out relay TD connected between these latter two conductors through contacts R-2 and L-2 is, therefore, de-energized and begins to drop out. Should this relay TD not become re-energized before its drop-out time elapses, its contacts TD-1 will close completing an energizing circuit for a buzzer, or other annunciator R.

Upon further movement of the T1 tap-changer to complete one tap-change step, contacts 23 re-close just before the tap-change is complete. Relay Z1 is thereby re-energized. Although contacts Z1-1 then reopen, relay X1 remains energized through its seal-in contacts X1-1 already described. Now if tap-changer T2 has not completed its operation it may be seen that the circuit between conductors A and 3 is still open since contacts Z2-2 and X2-2 are stil open. Consequently though contacts C1-1 re-close and though relay P may be energized to call for a further tap-change there will be no tap-change signal to either relay RC1 or LC1 until tap-changer T2 reaches its assigned position. Thus in the event that one tap-changer fails to complete its operation no further operations can occur in the remaining units and, after a certain delay interval, time delay relay TD drops out to operate the warning buzzer R.

Suppose, however, that tap-changer T2 is merely somewhat slower in completing its tap-change operation than T1. Contacts 33 re-close and re-energize relay Z2 to re-open its contact Z2-1 and re-close its contacts Z2-2. At this point it may be noted that both relays X1 and X2 are still energized because of their own seal-in or holding contacts X1-1 and X2-1, respectively. Immediately following the closure of contacts Z2-2 a circuit is completed from conductor A through closed contacts Z1-2 and Z2-2 to conductor 1, through closed contacts X2-3 and X1-3 and relay Y, thence to conductor B. Thus relay Y picks up, but only momentarily, since in picking up, its normally closed contacts Y-1 and Y-2 open the circuit between conductor B and relays X1 and X2 respectively, thus de-energizing relays X1 and X2, and permitting their normally open contacts X1-3 and X2-3 to re-open and thus open the circuit of relay Y.

Thus when all relays Z1, X1, Z2, X2 and Y have been restored to their original conditions another tap-change in either direction may be initiated by the closure of contacts PR or PL. If such relays are so reconditioned before the relay TD drops out there will be no annunciation by buzzer R, whereas if it occurs thereafter there will be annunciation but the same will be terminated when the relays are reconditioned.

Also it will be evident that no further operations can be initiated by way of contacts PR or PL if any unit starts but does not complete its operation.

Assume now that another operation has been initiated but that one of the tap-changers, such as T2, fails for one reason or another to start its movement. In that event relay Z2 remains energized and its contacts Z2-1 remain open. Relay X2, therefore, cannot pick up and its contacts X2-3 remain open. Relay Y, therefore, cannot pick up and, therefore, cannot open the circuit to permit X1 to drop-out. The series circuit through contacts X1-2 and X2-2, therefore, remains open and no further initiation signals can be given through contacts PR or PL.

Thus it has been seen that no further operations can occur in the remaining units in the event that any unit fails to start an operation.

In the event that none of the units can begin a tap-change operation, which may occur if the units are already on their limit position, and a limit switch (not shown) has been opened preventing motor field energization in a sense to pass the limit, should the primary relay P call for another operation beyond this limit there would be no response in terms of motor operation and no operation of relays Z1, X1, Z2, X2 or Y. However, the resultant energization of either relay R or L opens its associated contacts R-2 or L-2. Thus the circuit to relay TD from conductor 3 is broken and the buzzer B operates. Because the relays Z1, X1, Z2, X2 and Y remain undisturbed, however, relay P would be free to initiate a tap-change operation in the opposite direction, away from the limit position, by the closure of its appropriate contact PR or PL.

Additional transformers could be operated in a like fashion by connecting their associated Z and X relay contacts in a similar fashion to those shown on the drawing. In the event that transformers with other forms of motor circuits or with different operating speeds are paralleled then it may be necessary to adjust the setting of the 23, 33, etc. contacts to operate at some angle of movement of the tap-changer mechanism in relation to the speed of the tap-changer.

Although but one embodiment of the present invention has been illustrated and described, it would be apparent to those skilled in the art that various changes and modifications may be made therein without departing from the spirit of the invention or from the scope of the appended claims.

I claim as my invention:

1. A control system for at least two paralleled power transformers connected together on at least one side thereof, each having a tap-changer including a motor and associated motor energizing system actuable to move each said tap-changer; said control system comprising, in combination with said tap-changers, a control means responsive to a deviation in the power voltage at said connection to supply an actuation signal for the energizing systems of said motors, said energizing systems including means energizing said motors to turn by an amount limited to a single tap-change step in response to said actuation signal, separate switch means individual to the tap-changers and operable thereby in response to movement of the respective tap-changers from any position to any next adjacent position, said switch means having contacts which are in one condition at all tap positions of their respective tap-changers and in the opposite condition during movement of the tap-changer from any tap position to the next adjacent tap position; said switch means contacts being together serially connected with said control means and operable thereby to interrupt said signal supply of the latter in response to positioning of either of such contacts in said opposite condition.

2. The control system defined in claim 1, wherein each of said switch means comprises additional contacts likewise in one position at all tap positions of their respective tap-changers and in the opposite position during movement of the tap-changer from any tap position to the next adjacent tap position, separate relay means individual to the respective tap-changers, means forming an energizing circuit for each such relay means through said additional contacts of the switch means in said opposite condition of said additional contacts, the respective relay means having first contacts opened by the energization of said relay means and connected serially with each other and with the first-mentioned contacts of the switch means and to the signal supply to interrupt said supply by opening of any of these serially connected contacts, said relay means each further having second contacts open in the de-energized condition of the respective relay means and connected serially with the first-mentioned contacts of said switch means, and additional relay means and energizing circuit therefor extending through said second contacts of said first-mentioned relay means and the first-mentioned contacts of said switch means, thereby to energize said additional relay means by simultaneous closure of all of said last-mentioned serially connected contacts, each of the first-mentioned relay means having holding contacts therefor and said additional relay means having contacts, closed with the latter relay means de-energized, and serially connected with the respective holding contacts to complete a holding circuit for the respective first-mentioned relay means, whereby, in response to initiation of movement of either tap-changer, the signal supply remains interrupted unless and until all of said tap-changers advance to the next adjacent tap position.

3. The control system defined in claim 1, and additional separate switch means individual to the tap-changers and operable in response to movement of the respective tap-changers out of any tap position, said additional switch means having contacts which are in one condition at all tap positions of their respective tap-changers and are moved into the opposite condition upon initiation of movement of the tap-changer from any tap position to the next adjacent tap position, said additional switch means contacts being electrically connected with said signal supply, holding means operable to hold said additional switch means contacts in said opposite condition thereof in response to initiation of such movement of the tap-changer, whereby said signal supply is maintained interrupted during the holding action of either such holding means, and restoring switch means including contacts connected with the holding means of both of said additional switch means and adapted to be controlled by movement of the respective tap-changers, said restoring switch means being operable to release said holding means in response to movement of all the tap-changers into said next adjacent tap position, whereby the interruption of said signal supply by said additional switch means contacts is terminated.

4. The control system defined in claim 3, and time delay annunciator means operable to produce a warning signal in response to a change of energization thereof sustained for a predetermined period, and annunciator energization circuit means including said control means and said first-mentioned switch means, producing said predetermined change of energization of said annunciator means during response of said control means to a deviation in the power voltage while either of said first-mentioned switch means is in said opposite condition thereof, whereby said change of energization is initiated by movement of either tap-changer from any tap position to the next adjacent tap position and is terminated only by arrival of all such tap-changers in said next adjacent tap position or by the response of the control means, whereby said change of energization continues during a power voltage deviation or during movement of either tap-changer between positions, or both, or while all tap-changers are not on corresponding tap positions.

5. The control system defined in claim 1, and time delay annunciator means operable to produce a warning signal in response to a change of energization thereof sustained for a predetermined period, and annunciator energization circuit means including said control means and said first-mentioned switch means, producing said predetermined change of energization of said annunciator means during response of said control means to a deviation in the power voltage while either of said first-mentioned switch means is in said opposite condition thereof, whereby said change of energization is initiated by movement of either tap-changer from any tap position to the next adjacent tap position and is terminated only by arrival of all such tap-changers in said next adjacent tap positions or by the response of the control means, whereby said change of energization continues during a power voltage deviation or during movement of either tap-changer between positions, or both.

6. A control system for transformers connected together on at least one side, where each transformer is provided with a motor-operated tap-changer and with a motor energizing system adapted to rotate said motor through one complete tap-change step in response to an actuating signal; said control system comprising an actuating signal circuit having a primary contact, and means responsive to deviation of the power voltage of said connection to detect the voltage of said connection and in response thereto to close said primary contact; a power supply for said circuit; closed contacts in series in said circuit corresponding respectively to the individual tap-changers, means controlled by movement of the respective tap-changers and connected to the associated closed contacts to open the same individually in response to movement of said corresponding tap-changer from any tap position and operable to reclose the same as the tap-changer substantially completes the tap-change step to the next adjacent tap position.

7. A control system for power transformers connected together on at least one side, wherein each transformer is provided with a motor-operated tap-changer and with a motor energizing system adapted to rotate said motor through one complete tap-change step in response to an actuating signal; said control system being provided with an actuating signal circuit having a primary contact, and means to detect a power voltage variation at said transformers and in response thereto to close said primary contact, said circuit when completely closed being adapted to provide said actuating signal; a power supply for said circuit, a closed contact in series in said circuit corresponding to each said tap-changer; means controlled by movement of the respective tap changers and connected to the associated closed contacts to open the same individually in response to movement of its corresponding tap-changer through a predetermined portion of a tap-change step initiated by said signal, and to close substantially on completion of the tap-change operation to the next adjacent tap position.

8. A control system for power transformer motor energizing systems, where each transformer tap-changer motor energizing system is adapted to initiate and complete a tap-change to the next adjacent position, and no further, in response to a signal, a circuit adapted to cause when complete, said initiating signals to be sent to said motor energizing system; a primary contact in said circuit, closable in response to the deviations in magnitude of said power voltage from a predetermined range; a number of closed contacts in series with said primary contact said number corresponding to the number of said transformers, positionally controlled means operable to open each closed contact in response to the passage of its associated tap-changer through a given portion of any tap-change cycle measured from any tap-change position and closable in response to the passage of said tap-changer through a further given portion of any tap-change cycle to complete that tap-change operation to the next adjacent tap position.

9. A control system for at least two paralleled power transformers connected together on at least one side thereof, each having a tap-changer including a motor and associated motor energizing system actuable to move each said tap-changer; said control system comprising, in combination with said tap-changers, a control means responsive to a deviation in the power voltage at said connection to supply an actuation signal for the energizing systems of said motors, said energizing systems including means energizing said motors to turn by an amount limited to a single tap-change step in response to said actuation signal, separate switch means individual to the tap-changers and operable thereby in response to movement of the respective tap-changers from any position to any next adjacent position, said switch means having contacts which are in one condition at all tap positions of their respective tap-changers and in the opposite condition during movement of the tap-changer from any tap position to the next adjacent tap position; said switch means contacts being together serially connected with said control means and operable thereby to interrupt said signal supply of the latter in response to positioning of either of such contacts in said opposite condition, and additional switch means individual to the tap-changers, having signal interrupting contacts together serially connected with said control means and the serially connected contacts of the first switch means, and means controllingly connecting said first switch means to said additional switch means, respectively, to move the latters' contacts into position interrupting further signal supply from said control means with either of the first switch means in said one condition thereof.

10. The control system defined in claim 9 wherein said additional switch means includes a restoring control having actuating means operated by the first and additional switch means and having switch means connected to the additional switch means operatively to move the latters' contacts to a position restoring the signal supply connection through said latter contacts.

References Cited in the file of this patent
UNITED STATES PATENTS
2,512,989    Aicher ---------------- June 27, 1950